US007672968B2

(12) United States Patent
Bradateanu et al.

(10) Patent No.: US 7,672,968 B2
(45) Date of Patent: Mar. 2, 2010

(54) DISPLAYING A TOOLTIP ASSOCIATED WITH A CONCURRENTLY DISPLAYED DATABASE OBJECT

(75) Inventors: Vladimir Bradateanu, Ottawa (CA); Toufic Milan, Ottawa (CA); Lee McIntyre, Vancouver (CA); Geraldine Vahey, San Francisco, CA (US); John Lorin Welshofer, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 307 days.

(21) Appl. No.: 11/128,459

(22) Filed: May 12, 2005

(65) Prior Publication Data

US 2006/0259503 A1 Nov. 16, 2006

(51) Int. Cl.
*G06F 3/048* (2006.01)
*G06F 17/00* (2006.01)

(52) U.S. Cl. .................. 707/102; 707/104.1; 715/711
(58) Field of Classification Search .................. 707/1, 707/2, 3, 4, 5; 715/700
See application file for complete search history.

(56) References Cited

U.S. PATENT DOCUMENTS

| | | | | | |
|---|---|---|---|---|---|
| 5,421,008 | A | * | 5/1995 | Banning et al. | 707/4 |
| 5,544,352 | A | * | 8/1996 | Egger | 707/5 |
| 5,550,971 | A | * | 8/1996 | Brunner et al. | 707/3 |
| 5,566,330 | A | * | 10/1996 | Sheffield | 707/4 |
| 5,812,840 | A | * | 9/1998 | Shwartz | 707/4 |
| 5,991,756 | A | * | 11/1999 | Wu | 707/3 |
| 6,202,060 | B1 | * | 3/2001 | Tran | 707/3 |
| 6,263,328 | B1 | * | 7/2001 | Coden et al. | 707/3 |
| 6,282,547 | B1 | * | 8/2001 | Hirsch | 707/102 |
| 6,313,833 | B1 | * | 11/2001 | Knight | 705/36 R |
| 6,326,962 | B1 | * | 12/2001 | Szabo | 715/762 |
| 6,529,217 | B1 | * | 3/2003 | Maguire et al. | 715/769 |
| 6,563,514 | B1 | * | 5/2003 | Samar | 715/711 |
| 6,591,295 | B1 | * | 7/2003 | Diamond et al. | 709/217 |
| 6,693,651 | B2 | * | 2/2004 | Biebesheimer et al. | 715/837 |
| 6,732,094 | B1 | * | 5/2004 | Cousins et al. | 707/5 |
| 6,748,392 | B1 | * | 6/2004 | Galindo-Legaria et al. | 707/102 |
| 6,750,864 | B1 | * | 6/2004 | Anwar | 345/440 |
| 6,785,850 | B2 | * | 8/2004 | Dzoba et al. | 714/46 |

(Continued)

FOREIGN PATENT DOCUMENTS

EP 541298 A2 * 5/1993

OTHER PUBLICATIONS

"MySQL Query Browser Manual," Apr. 9, 2004 (first publication date; copyright 2004), MySQLPress, revision 10347, pp. 2-63.*

(Continued)

*Primary Examiner*—Pierre M Vital
*Assistant Examiner*—Christopher P Nofal
(74) *Attorney, Agent, or Firm*—Beyer Law Group LLP

(57) ABSTRACT

Techniques for displaying information associated with a database are disclosed. A database-informer displays information (or additional information) about various database objects displayed for a user. The database-informer may be presented to user as a tool-tip. However, the database-informer can be customized and dynamically constructed based on various variables that are dynamically determined at runtime. As such, the information can be dynamically determined based on variables stored in different tables and provided on-demand when the database-informer is invoked by the user. As a result, database users can be provided with customized and up-to-date information without having to view different tables.

20 Claims, 11 Drawing Sheets

U.S. PATENT DOCUMENTS

| | | | |
|---|---|---|---|
| 6,828,988 B2* | 12/2004 | Hudson et al. | 715/711 |
| 7,003,730 B2* | 2/2006 | Dettinger et al. | 715/764 |
| 2002/0033848 A1* | 3/2002 | Sciammarella et al. | 345/838 |
| 2002/0123984 A1* | 9/2002 | Prakash | 707/1 |
| 2002/0198810 A1* | 12/2002 | Roger | 705/36 |
| 2003/0158847 A1* | 8/2003 | Wissner et al. | 707/10 |
| 2003/0217111 A1* | 11/2003 | McKay | 709/207 |
| 2004/0243593 A1* | 12/2004 | Stolte et al. | 707/100 |
| 2005/0028107 A1* | 2/2005 | Gomes et al. | 715/762 |
| 2005/0149506 A1* | 7/2005 | Hatscher et al. | 707/3 |
| 2005/0210000 A1* | 9/2005 | Michard | 707/3 |
| 2005/0256852 A1* | 11/2005 | McNall et al. | 707/3 |
| 2005/0278286 A1* | 12/2005 | Djugash et al. | 707/1 |
| 2006/0004740 A1* | 1/2006 | Dettinger et al. | 707/4 |
| 2006/0069694 A1* | 3/2006 | Rossi et al. | 707/101 |
| 2007/0208722 A1* | 9/2007 | Dettinger et al. | 707/4 |
| 2007/0260582 A1* | 11/2007 | Liang | 707/2 |

OTHER PUBLICATIONS

John Viescas, "Running Microsoft Access 2000, Chapter 1-Microsoft Access Is a Database and More," Microsoft Press, 1999, pp. 3-17.

John Viescas, "Running Microsoft Access 2000, Chapter 2-Rhe Uses of Microsoft Access," Microsoft Press, 1999, pp. 19-30.

John Viescas, "Running Microsoft Access 2000, Chapter 4-Designing Your Database Application," Microsoft Press, 1999, pp. 79-106.

John Viescas, "Running Microsoft Access 2000, Chapter 24-The Finishing Touches," Microsoft Press, 1999, pp. 895-919.

* cited by examiner

Task Management

Projects  Tasks  Contacts

Presentation for Dev Mgrs

Name: Presentation for Dev Mgrs
Type: Preso
Description: Overview of messaging, product line, customers, marketing themes and features Status: Open — 356
302  Project opened on 1/19/2005 — 352
350

Home  Companies  Contacts  Invoices  Products  Reports

List  Detail  New  Delete  Find  Show All  Print  Record 2 of 4 (7 total)

Company Info
Company: ACME Widgets  ID 1
Contact: Richard
Type: Non-Profit Organization
Status: Active Hot
Company Notes:

Bill to
Location: Main  Attn:
Address: 123 Elm St — 364
366
City/St/Postal: Anytown  Primary Phone: (800) 123-4567 /Postal
Country: USA  Country
362

Ship to
Location
Address
Country

Fig. 3D

DISPLAYING A TOOLTIP ASSOCIATED WITH A CONCURRENTLY DISPLAYED DATABASE OBJECT

BACKGROUND OF THE INVENTION

The present invention relates to databases and, more particularly, to displaying information for the users of databases.

Databases are used to store data in a manner that facilitates subsequent use of the data. Typically, a database stores several tables which each include several records. Each one of the records can have several fields used to hold various types of information, for example, about a subject or an item.

More conventional databases, among other things, have proved to be difficult to access by an average user because some programming and/or system level knowledge is required to access them, for example, by using Structured Query Language (SQL). SQL is a standard interactive and programming language for getting information from and updating a database.

To allow end-users to more easily access and manage data stored in databases, database products (or programs) have been recently developed. Database products, among other things, often provide a user-interface, which allows users to conveniently perform various operations on data stored in the database. The interface provided by the database product is typically a Graphical User Interface (GUI) which allows the user to conveniently interact with the database product, and in turn, with the database. The user may interact with the Graphical User Interface (GUI) to, for example, view reports generated by the database product, or enter data into fields of a record. The visual representations of data provided by the database product can, for example, include a "browse" mode which allows records to be viewed, changed, sorted, deleted, or added.

It should be noted that a database product (or program) could also be provided as a database server (or host), which allows a client (or a guest) to access data in a database which is typically located in a remote physical location with respect to the client. Generally, a first database application program can, for example, be connected to a second database application program over a computer network. In any case, one database application program can act as a "client" (or guest) and establish a connection to another database application program which acts as "server" (or host) to a database. The client database application program can, in turn, provide the end-user (e.g., a human, or application program) with access to data, which is stored remotely.

As databases have become more prevalent in many modern computing environments (e.g., corporate environments, home-offices, homes), improved techniques for displaying information stored in databases would be useful.

SUMMARY OF THE INVENTION

Broadly speaking, the invention relates to techniques for displaying information associated with a database. The techniques can be used to provide a database-informer which displays information (or additional information) about various database objects that are displayed. It will be appreciated that the user can determine what information (or additional information) is to be displayed in connection with a selected database object. In other words, the user may be given the option to customize the database-informer, but it is possible for the database designer to lock-down the database-informer (i.e., define the database-informer for the user). It will also be appreciated that the desired information can be dynamically determined and provided on-demand (i.e., at the user's request). As a result, database users can be provided with customized up-to-date information about various database objects. In addition, information can be provided to the database users on-demand to minimize display of information which is not always desired by the user or necessary.

In accordance with one aspect of the invention, a user of a database product (e.g., a database program) can define an expression (e.g., a calculation expression) for a database object (e.g., database field, title, icon) that can be displayed for the user as output (e.g., report database). In general, a database object can be any object that has an associated representation that is capable of being displayed for the user. In one embodiment, various database objects are displayed for the user in a layout (or design) form typically used to design the output (e.g., database reports) which is displayed to the user. It will be appreciated that a user of the database product can conveniently construct an expression for the database by interacting with a Graphical User Interface (GUI) that automatically displays and updates various options (e.g., tables, fields) that can be selected to construct the expression in accordance with one aspect of the invention. Also, it will be appreciated that the expression may be constructed using a combination of general formulas (e.g., logic, arithmetic, text) and database-specific operations and components (e.g., fields, state variables or functions of the database). In general, the expression can be based on one or more variables which are evaluated dynamically at runtime. Hence, a user can conveniently use a GUI to construct a very complex expression that is dynamically calculated on-demand and displayed for the user in accordance with another aspect of the invention.

The user can request to display the information by triggering an event or satisfying a condition (e.g., hovering a cursor in a determined proximity of a displayed database object for a determined amount of time). When the request for displaying the information is received, a database product can automatically retrieve the expression, execute it, and display the result of the execution for the user in accordance with one aspect of the invention. Typically, the result of the expression is displayed in a determined proximity of the displayed database object and the user can end the display by triggering an event or satisfying another condition (e.g., moving the cursor away from the determined proximity of the displayed database object).

It should be noted that the database-informer described above may be introduced to database users, for example, as a "tooltip" or any other name which may be readily understandable to the user. However, it will be appreciated, that unlike a conventional "tooltip" that displays static information, a database-informer can be customized to dynamically evaluate variables and display the information where and when the user wants it. Furthermore, there is no need to store what will be displayed or change the schema (or design) of a database in order to dynamically provide users with customized information on-demand as a calculation engine can be utilized to dynamically calculate an expression that defines the information to be displayed in accordance with an embodiment of the invention which will be further discussed below.

However, it will be appreciated by those skilled in the art that the invention can be implemented in numerous ways, including as a method, an apparatus, a computer readable medium, a database product, program, or system. Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIGS. 3A-3H depicts representative screens in accordance with several embodiments of the invention.

DETAILED DESCRIPTION OF THE INVENTION

Figure 1A:
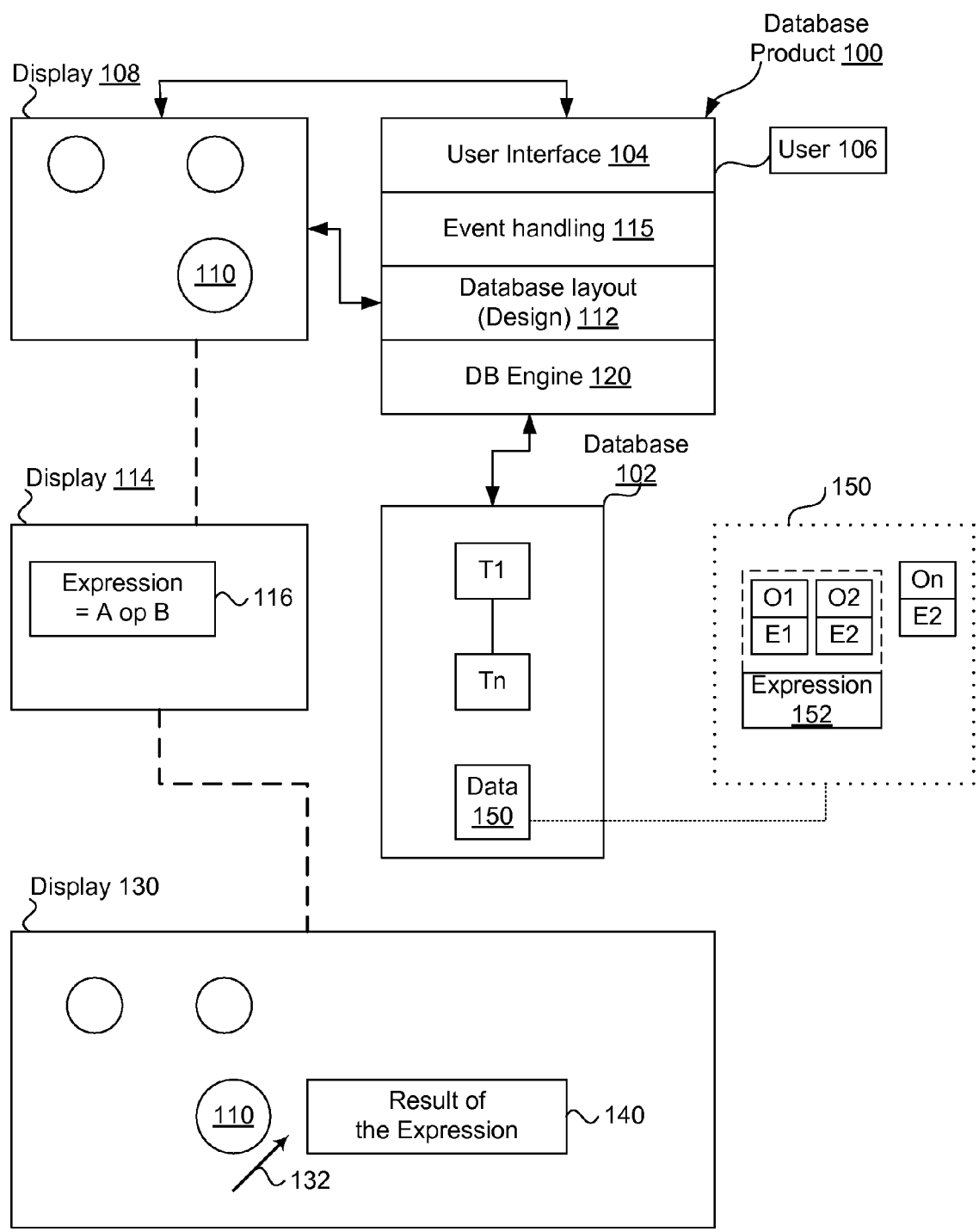
FIG. 1A depicts a database product (e.g. a database program) in accordance with one embodiment of the invention.

As noted in the background of the invention, as databases have become more prevalent in many modern computing environments (e.g., corporate environments, home-offices, homes), there is a need for improved techniques for displaying information stored in databases.

The techniques can be used to provide a database-informer which displays information (or additional information) about various database objects that are displayed. It will be appreciated that the user can determine what information (or additional information) is to be displayed in connection with a selected database object. In other words, the user may be given the option to customize the database-informer, but it is possible for the database designer to lock-down the database-informer (i.e., define the database-informer for the user). It will also be appreciated that the desired information can be dynamically determined and provided on-demand (i.e., at the user's request). As a result, database users can be provided with customized up-to-date information about various database objects. In addition, information can be provided to the database users on-demand to minimize display of information which is not always desired by the user or necessary.

In accordance with one aspect of the invention, a user of a database product (e.g., a database program) can define an expression (e.g., a calculation expression) for a database object (e.g., database field, title, icon) that can be displayed for the user as output (e.g., report database). In general, a database object can be any object that has an associated representation that is capable of being displayed for the user. In one embodiment, various database objects are displayed for the user in a layout (or design) form typically used to design the output (e.g., database reports) which is displayed to the user. It will be appreciated that a user of the database product can conveniently construct an expression for the database by interacting with a Graphical User Interface (GUI) that automatically displays and updates various options (e.g., tables, fields) that can be selected to construct the expression in accordance with one aspect of the invention. Also, it will be appreciated that the expression may be constructed using a combination of general formulas (e.g., logic, arithmetic, text) and database-specific operations and components (e.g., fields, state variables or functions of the database). In general, the expression can be based on one or more variables which are evaluated dynamically at runtime. Hence, a user can conveniently use a GUI to construct a very complex expression that is dynamically calculated on-demand and displayed for the user in accordance with another aspect of the invention.

The user can request to display the information by triggering an event or satisfying a condition (e.g., hovering a cursor in a determined proximity of a displayed database object for a determined amount of time). When the request for displaying the information is received, a database product can automatically retrieve the expression, execute it, and display the result of the execution for the user in accordance with one aspect of the invention. Typically, the result of the expression is displayed in a determined proximity of the displayed database object and the user can end the display by triggering an event or satisfying another condition (e.g., moving the cursor away from the determined proximity of the displayed database object, waiting for a determined amount of time).

It should be noted that the database-informer described above may be introduced to database users, for example, as a "tooltip" or any other name which may be readily understandable to the user. However, it will be appreciated, that unlike a conventional "tooltip" that displays static information, a database-informer can be customized to dynamically evaluate variables and display the information where and when the user wants it. Furthermore, there is no need to store what will be displayed or change the schema (or design) of a database in order to dynamically provide users with customized information on-demand as a calculation engine can be utilized to dynamically calculate an expression that defines the information to be displayed in accordance with an embodiment of the invention which will be further discussed below.

Embodiments of these aspects of the invention are discussed below with reference to FIGS. 1A-5. However, those skilled in the art will readily appreciate that the detailed description given herein with respect to these figures is for explanatory purposes as the invention extends beyond these limited embodiments.

FIG. 1A depicts a database product 100 (e.g. a database program) which can access a database 102 in accordance with one embodiment of the invention. As shown in FIG. 1A, the database 102 includes a plurality of tables ($T_1, \ldots, T_n$). The database product 100 also provides a user interface 104 which can be used by a user 106 to access the database 102. Hence, the user 106 may access the plurality of tables ($T_1, \ldots, T_n$) in database 102 via the user interface 104 of the database product 100. Typically, the user interface 104 is a Graphical User Interface (GUI) which can display for the user 106 information associated with the database 102. As such, the user 106 may receive output and provide input to the database product 100 by interacting with the display 108. Referring to FIG. 1A, a display 108 may, for example, display various database objects (e.g., a database field, title, icon, header, footer) for the user 106. These database objects may be displayed in display 108 in various modes (e.g., view, design) for the user 106. In a view mode, database objects may be presented primarily for the user's viewing (e.g., database report). However, a user may be able to manipulate database objects in other view modes. By way of example, the user may select a database object displayed in a layout (or design) mode 110. A layout (or design) mode allows the user 106 to specify the layout of information to be displayed as output (e.g., reports) by the database product 100. As shown in FIG. 1A, a database layout layer 112 may generate a layout page on display 108 for the user 106 which can interact with the user interface 104. An event handling layer 115 may also be implemented between the user interface 104 and the database layout 112 to process events including those associated with user's 106 interaction.

Referring to FIG. 1A, a database object 110 displayed in the display 108 can be selected by the user 106. Moreover, the user 106 can define an expression which specifies information to be displayed for the selected database object 110 on user's 106 demand. By way of example, when the user 106 selects the database object 110 in display 108 and requests to define an expression for it, a display 114 can be displayed for the user 106. The user 106 can then enter an expression 116 for the selected database object 110. As will be appreciated, the expression 116 may be a complex calculation expression which is defined based on various other database objects, or a relatively simple mathematical calculation, logical, or text operation. In any case, the expression 116 can be evaluated (e.g. calculated) by the database engine 120 to determine an output which is displayed for the user 106, as will be described below.

When an expression 116 has been defined for the database object 110, then the user 106 may subsequently request to display the information, for example, during viewing of a page (e.g., report) that displays the object in a display 130. Typically, the user 106 can activate the display of the information 104 in the display 130 by triggering an event which is processed by the event handling 115 of the database product 100. By way of example, the user 106 may hover a cursor 132 for a determined amount of time (e.g., 2 seconds) in close proximity of the database object 110. It should also be noted that an event may be triggering based on one or more operating requirements. In any case, when the display of the information defined by the expression 116 for the database object 110 is initiated, the expression 116 is evaluated by the database engine 120. Thereafter, the result 140 of the evaluation is displayed in display 130. Typically, the result is displayed in close proximity of the cursor and/or the displayed database object 110. The expression 116 and the process of defining and evaluating it will be described in greater detail below. But first the following observations which should be made by those skilled in the art will be discussed.

It will be appreciated by those skilled in the art that it is possible to display (or disable) the database-informer in variety of ways, for example, by using a global setting pertaining to all database-informers, or a more specific setting pertaining specific tables, forms, or layouts. Typically, there are different classes of database users. One such group of users can be referred to as database designers that, among other things, build the database schema, forms, reports, automated scripts. The other group of users may be referred to as end-users who typically create, search, edit and delete records. It will be appreciated that a database designer may define a database-informer for end-users and/or allow the end-users to define a database-informer. It should also be noted that the expression 116 can be associated with the database object 110 and stored in the database 102. However, as will be appreciated by those skilled in the art, there is no need to store the expression as database schema. In general, expressions $E_1, \ldots, E_n$ may be defined respectively for database objects $O_1, \ldots, O_n$ and, for example, stored as data 150 in the database 102. It should also be noted that an expression 152 may be associated with a group of database objects ($O_1$ and $O_2$) where each of the database objects may have an expression of their own ($E_1$ and $E_2$). In general, an expression can be associated and stored, for example, as a property of a database object.

Figure 1B:
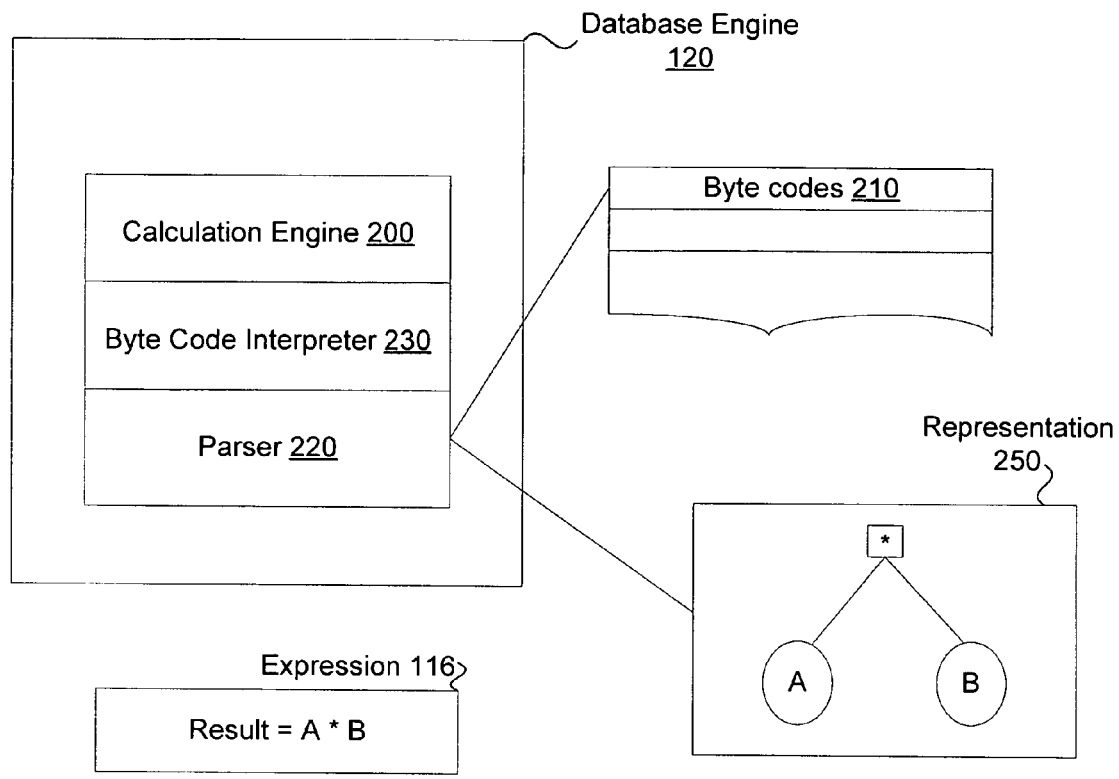
FIG. 1B depicts a calculation engine suitable for calculating a calculation expression defined for a database object in accordance with one embodiment of the invention.
Figure 1B:
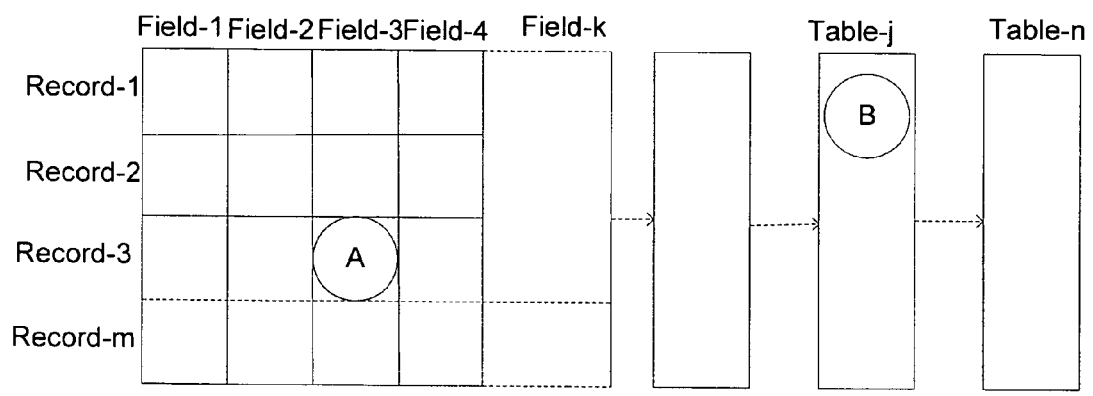

FIG. 1B depicts a calculation engine 200 suitable for calculating an calculation expression 116 defined for a database object 110 in accordance with one embodiment of the invention. As shown in FIG. 1B, the calculation expression 116 may be defined based on values of various fields (e.g., A, B) in records stored in various tables in the database. These records may be several tables away from each other, but are typically linked in a relationship that links a set of tables ($T_i$-$T_j$) in the database. As will be appreciated, this allows a user to define an expression for a database object that is stored in one table based on information in other tables which are not typically displayed when the database object is displayed. In addition, information may be displayed only when needed (on-demand) and without having to store the information in the database. Furthermore, the information is dynamically calculated, so the user is automatically provided with up-to-date information at time the calculation expression 116 is evaluated.

The calculation expression 116 is represented as one or more byte-codes (210) in accordance with one embodiment of the invention. The bytecode (210) can be generated for the expression 116 by parsing the expression using a parser (220). The parser (220) may, for example, generate a binary tree representation (250) which is used to generate byte-codes (210) which are interpreted (be executed) by the bytecode interpreter (230) to calculate the result of the expression 116 before it is displayed. It should be noted that in general, the expression may be determined after it has been determined to display the information. As such, it is possible to, for example, redefine, or dynamically define the expression itself when the expression is determined. By way of example, a first defined expression may be used when a first condition is met, a second expression may be used when a second condition is met, an event can cause altering the expression itself, and so on.

Figure 2:
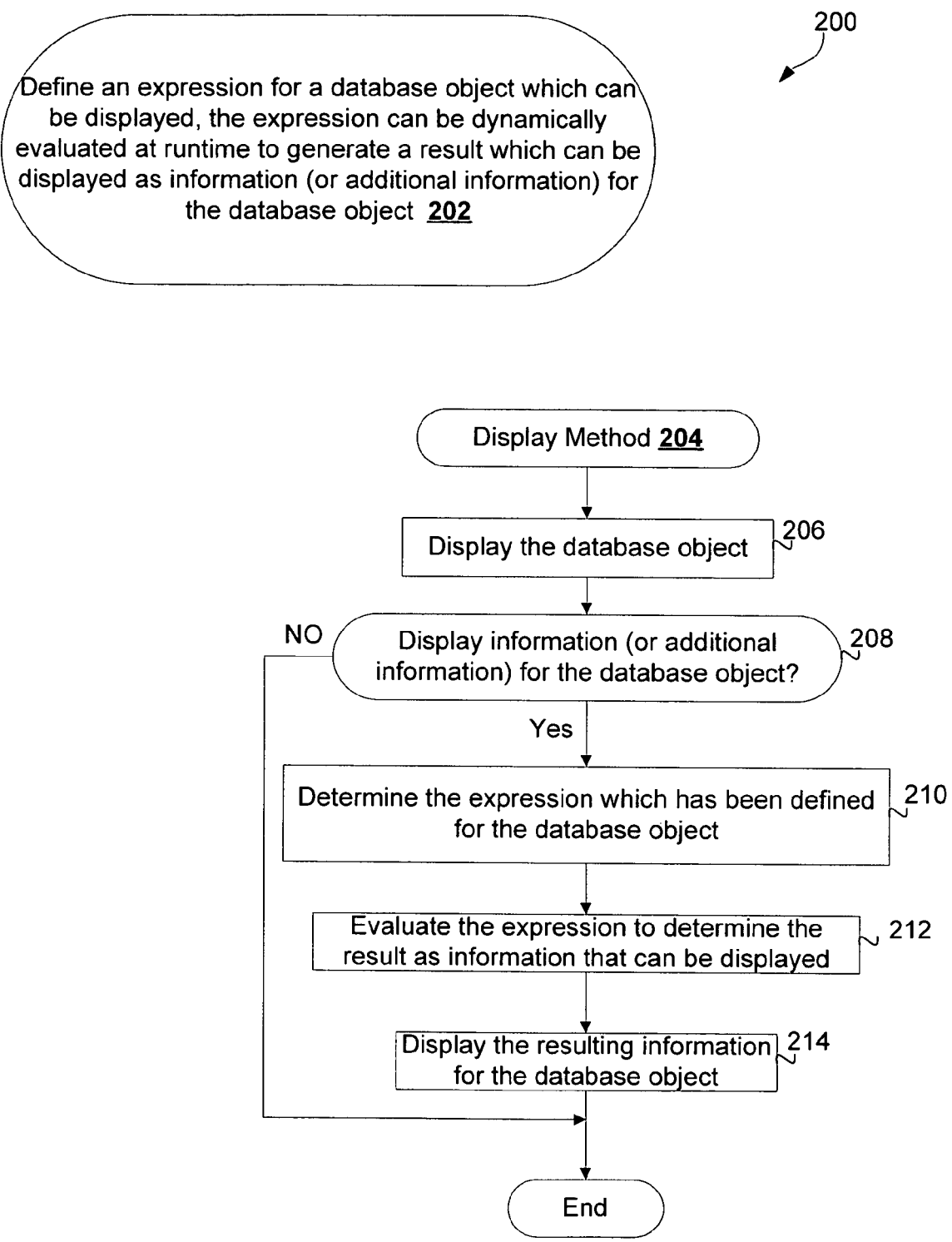
FIG. 2 depicts a calculation engine suitable for calculating a calculation expression defined for a database object in accordance with one embodiment of the invention.

FIG. 2 depicts a display method 200 for providing information (or additional information) for a database object in accordance with one embodiment of the invention. The database object can, for example, be displayed by a database product (e.g., database product 100 shown in FIG. 1A). As such, the display method 200 may be used, for example, by the data product 100 to provide information (or additional information) for a database object 110 (shown in FIG. 1A).

Initially, an expression is defined (202) for a database object which can be displayed. It should be noted that the expression can be dynamically evaluated at runtime to generate a result which can be displayed as information (or additional information) for the database object. The process of defining (202) an expression will be described in greater detail below.

A display method 204 will now be described. After an expression is defined (202), a display method 204 initially displays (206) the database object for which an expression has been defined (202). By way of example, a database product (or program) may display one or more database objects as output (e.g., report) in a browse or (view) page (or mode of operation). In any case, when the database object is displayed, it is determined (208) whether to display the information (or additional information) which has been defined (202) by the expression for the database object. This determination (208) may be made, for example, based on user input (e.g., by triggering an event or satisfying a condition, for example, hovering a mouse for a determined amount of time in a determined proximity of the database object). In general, the determination (208) may be made based on any programmable criteria (e.g., automatically invoking a database-informer for a determined set of database objects).

In any case, if it is determined (208) not to display the information for the object, the display method 204 ends. However, if it is determined (208) to display the information for the object, the expression which has been defined (202) for the database object is determined (210). Typically, the expression defined for the objects is associated with the object and stored (e.g., as a property of the database objects), In general, the expression may be determined (208) after it has been determined (208) to display the information. As such, it is possible to, for example, redefine, or dynamically define the expression itself when the expression is determined (210). By way of example, a first defined expression may be used when a first condition is met, a second expression may be used when a second condition is met, an event can cause altering the expression itself, and so on.

After the expression has been determined (210), the expression is evaluated (212) to determine the result of the evaluation as information which can be displayed for the database object. Accordingly, the information is displayed (214) for the database object. The display method 204 ends after the information is displayed (214) for the database object. However, it should be noted that other operations may be performed before the display method 204 ends. For example, it can be determined whether to end the display of the information and/or the object itself, for example, based on user input, an event, or condition. The display method 204 will be described below in greater detail in accordance with one embodiment of the invention.

As noted above, a database product (e.g., a database program) may be used to define an expression for database objects it displays. In addition, the expression can be dynamically evaluated by at runtime by the database product to generate and display the desired information (or additional information) in connection with the database object. Furthermore, a database product can provide a Graphical User Interface (GUI) which allows a user to conveniently define an expression for database objects in accordance with one aspect of the invention. FIGS. 3A-3G are representative screens which illustrate defining a calculation expression using a GUI provided in accordance with one aspect of the invention.

Figure 3A:
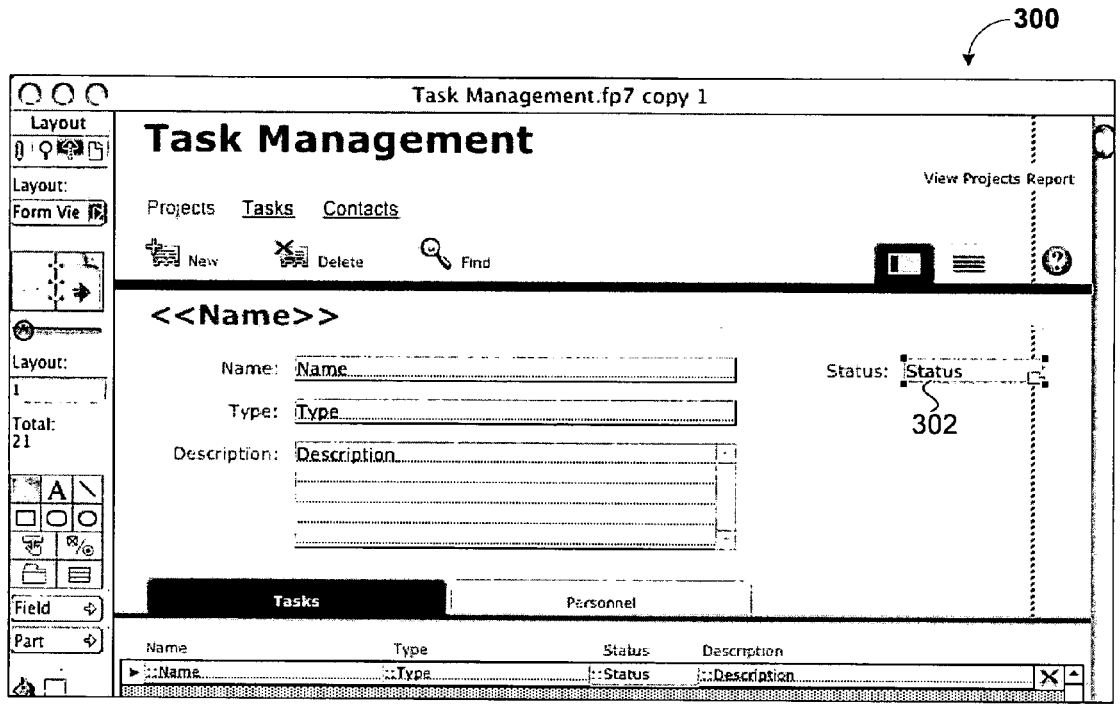
Figure 3A:
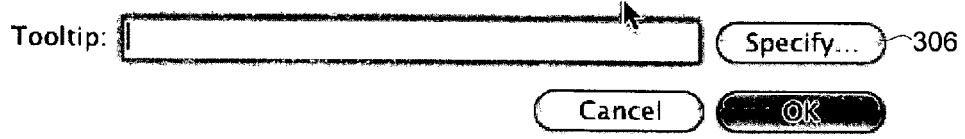

FIG. 3A depicts a screen 300 representative of a page displayed in layout mode in accordance with one embodiment of the invention. Initially, a database object, a "status" field 302 is selected. As will be demonstrated, a calculation expression can be defined for the "status" field 302. More particularly, a dialog 304 can be initiated as depicted in FIG. 3A in accordance with one embodiment of the invention. Referring to dialog 304 shown in FIG. 3A, when a "specify calculation" option 306 is selected, a "specify calculation" dialog can be opened for the user.

Figure 3B:
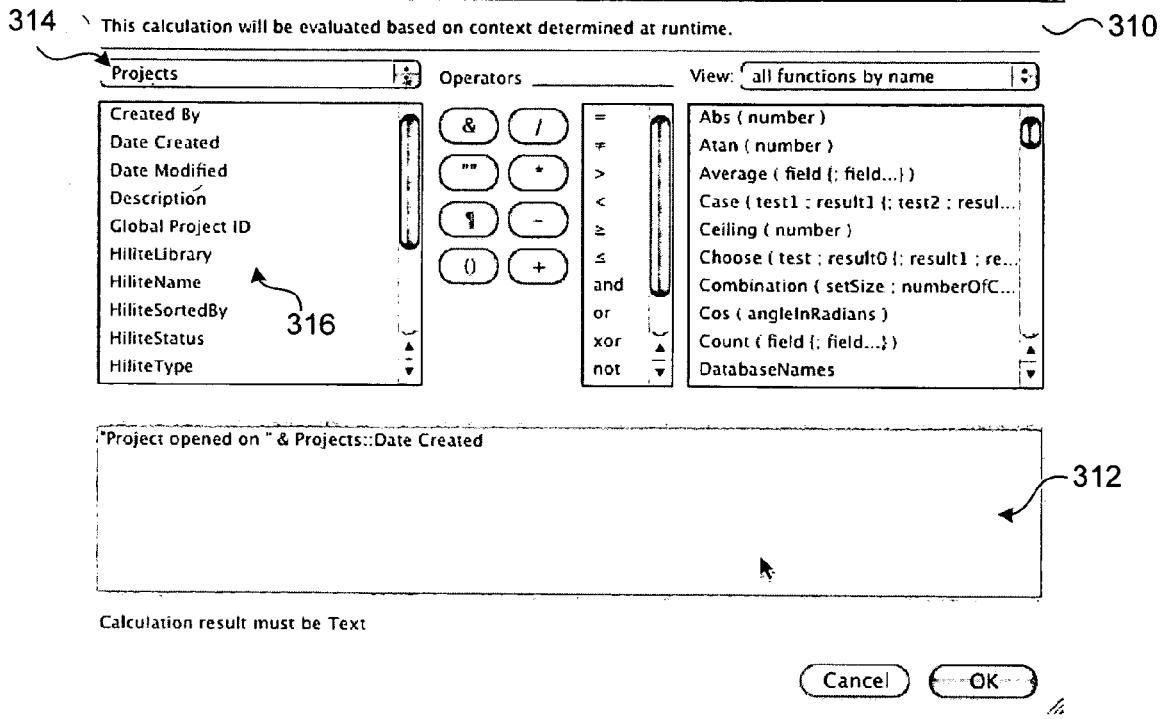
Figure 3B:
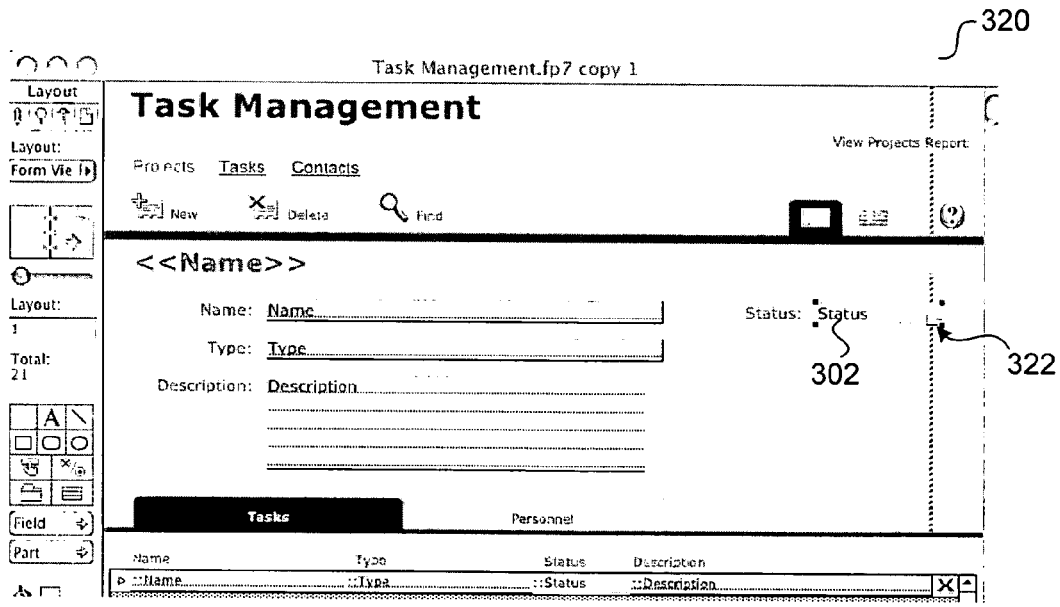

FIG. 3B depicts an exemplary "specify calculation" screen 310 in accordance with one embodiment of the invention. As shown in FIG. 3B, a calculation expression is displayed in a display portion 312. This calculation expression is defined for a database object, namely the "status" field 302 (shown in FIG. 3A) of the table "projects" which is displayed in a portion 314 of the screen 310 in FIG. 3B.

It will be appreciated that the calculation expression displayed in display portion 312 may be conveniently constructed by selecting one or more of the options displayed in the display portion 316. In this example, various fields of the table "projects" are displayed and a particular field, namely, "Date Created" is selected to generate the expression in the display portion 312. In general, a database product automatically determines and displays the options which can be selected by the user in accordance with one aspect of the invention. These options may, for example, be determined and displayed as one or more fields from a table in the display portions 314 and 316. In one embodiment, the user is able to view and select form a list of tables displayed in the display portion 314 (not shown). In addition, as a result of the selection of a table in the display portion 314, the list of selectable fields for the table is automatically updated by the database product and displayed in the display portion 316 (not shown). It should be noted that the database product can examine the relationship between data stored in a database in order to, for example, determine what tables are related to each other, so that the user can be provided with a list of options to select and conveniently construct the expression in the display 312.

In addition, as shown in FIG. 3B, various general formulas and database specific fields, functions, operations can be provided and made readily available for selection by the user. It should be noted that the options provided in the display portion 316 can be automatically determined by the database product and displayed for the user. In accordance with one embodiment of the invention, a database product determines what database tables or fields may be used to define an expression for a selected database field or table. This determination can, for example, be made by examining the relationship between data stored in the database in order to determine what tables or fields are related. It should be noted that these fields may be in different tables and several tables away from the particular field which has been selected by the user. Nevertheless, these fields can be determined and displayed, for example, in the display portion 316 for the user.

As shown in FIG. 3B, the calculation expression in display portion 312 concatenates ("&") a string of characters ("Project opened on") and the "Date Created" field of the table "projects." The calculated result of this expression is depicted in display portion 352 of FIG. 3C which is also discussed below. However, referring to screen 320 of FIG. 3B, it should be noted that an indicator (e.g., icon) 322 (e.g., small yellow box) may be displayed for a database object that has an associated defined expression (e.g., "status" field 302 also shown in FIG. 3A). The indicator 322 is further discussed below.

However, referring back to FIG. 3B, after the calculation expression has been defined in the display 312 (shown in FIG. 3B), the user has the option of requesting to display the information defined by the calculation expression. When the request is made, the database product calculates the calculation expression and displays the result for the user. Referring now to FIG. 3C, an exemplary screen 350 is depicted in accordance with one embodiment of the invention. The screen 350 depicted in FIG. 3C represents a view (or browse) page where information resulting from the calculation of the calculation expression (displayed in display portion 312 of FIG. 3B) has been displayed in a display portion 352. This information displays the string of ("Project opened on") with the current value found in the "Date Created" field of the table "projects" which is displayed as: "1/19/2005."

It should also be noted that the user can request that information be displayed by hovering a cursor in proximity of the database object 302 for a determined amount of time (e.g., 2 seconds). Normally, the database object 302 shows the "status" (e.g., open, closed) in a "project" table. However, by hovering a cursor, or initiating another event, or satisfying a condition, the user can request that information defined by the calculation expression be displayed. In this example, in addition to seeing that a project is "open," that user can also request and be provided with the date the project was opened. Hence, the user can customize the information (or additional) information to be displayed by for a database object by defining a calculation expression and then request to see the information which will be dynamically determined on-demand for the user. It should be noted that the user can also request to end the display of this information by moving the cursor away from the proximity of the database object in the display area 302. This means that screen 350 need not be cluttered with information. Also, it will be appreciated that there is no need to store the result of the calculation as part of data in the database as it is possible to recalculate the calculation expression every time the user requests the information, for example, by hovering the cursor as discussed above. As such, customized information can be provided to the user dynamically and on-demand without changing the structure of database or adding schema.

It should also be noted that it is possible to construct calculation expressions that are much more complex that the relatively simple example discussed above, as the invention allows use of various general and database specific terms to construct a calculation expression. These terms include variables (e.g., database fields, status variables) that are determined dynamically at run time. By way of example, general formulae include: logic operators (e.g., AND, OR, XOR), textual functions (e.g., extract words, count the number of words, extract leftmost), text formatting (e.g., font, line spacing), mathematical-functions (e.g., factorial, logarithm), and other miscellaneous functions (e.g., date, time). As will be appreciated, these general operations can be combined with specific database terms (e.g., database fields, database state variables) to construct extremely complex calculation expressions. Furthermore, users of the database product can construct extremely complex calculations with relative ease by interacting with an GUI interface that displays various options that are available. This is possible because the database product is able to utilize the relationship between data to automatically determine and update available options which are presented to the user. Also, the database product can utilize a robust calculation engine which allows many general operations to be combined with specific database components and operations.

As another example, a calculation expression can be constructed that determines the number of days a project has been opened, or report who opened the projects for the status field shown in FIG. 3C. FIG. 3D depicts another exemplary screen 360 in accordance with one embodiment of the invention. Screen 360 is a representative of an invoice information form. As shown in FIG. 3D, the text string: "primary phone: (800) 123-4567" is displayed in a display portion 362. This text string is displayed in the display portion 362 when the cursor 364 hovers over the "Address" area 366 for a determined amount of time. It should be noted that this information displayed in the display portion 362 is a phone number which corresponds to the address in the "Address" area 366. As will be appreciated, a user of the database product may view a phone number for an address by hovering the cursor 364 over the Address" area 366. This allows the user to easily access the data where and when it is desired without cluttering the screen 360. As will also be appreciated, the record that stores the phone number displayed in the display portion 362 need not be in the same table used to store the address displayed in the "Address" area 366. The phone number may be stored in another table that is related to the table which stores the address. The relationship between these tables is displayed in FIG. 3E.

Figure 3E:
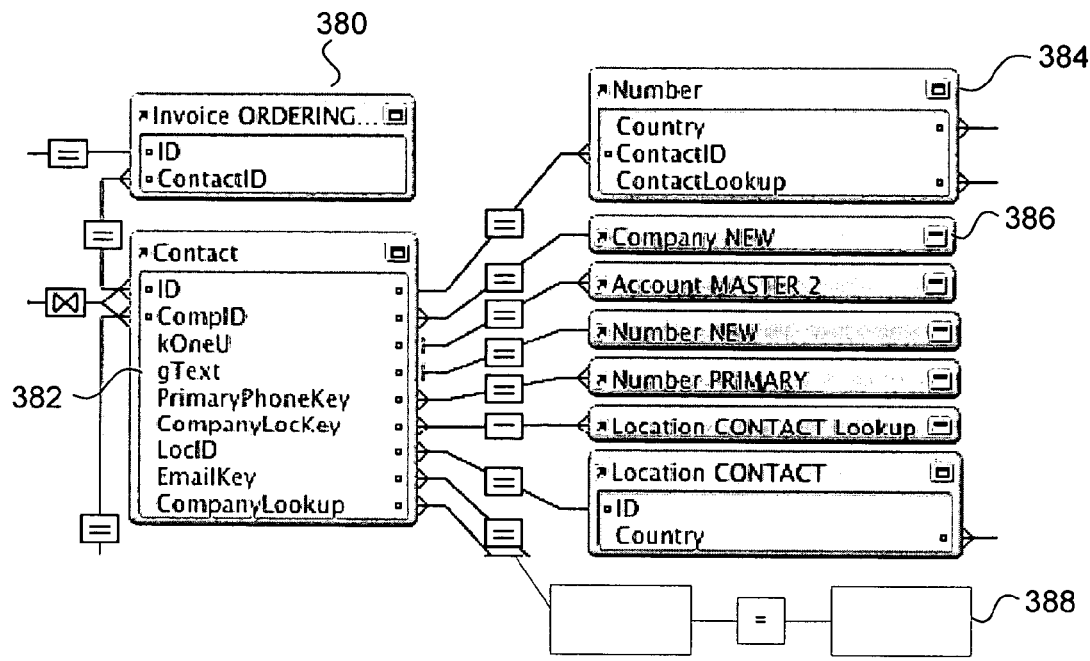

Referring now to FIG. 3E, the relationship between several related tables is depicted. As shown in FIG. 3E, tables 380, 382 and 384 are related by at least one common field (contactID). The "Address" displayed in area 366 (shown in FIG. 3D) is provided in table 382, but the corresponding phone number is stored in table 384. It should be noted that the phone number stored in table 384 can be automatically retrieved by the database product and the user need not display the table 384 to view a record. It should also be noted that a table may be several tables away from table 380 (e.g., table 386), yet the data can be retrieved by the database program if the user defines a calculation expression that uses a field from a table several tables away (e.g., table 386). Additional examples are displayed in FIG. 3F and FIG. 3G.

Figure 3F:
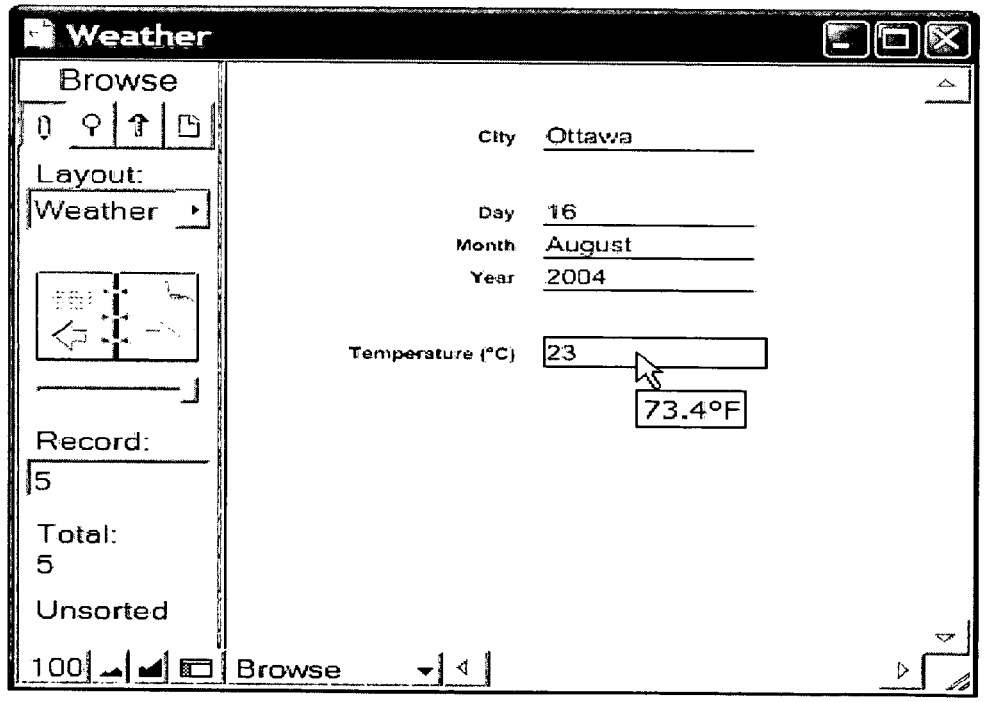
Figure 3G:
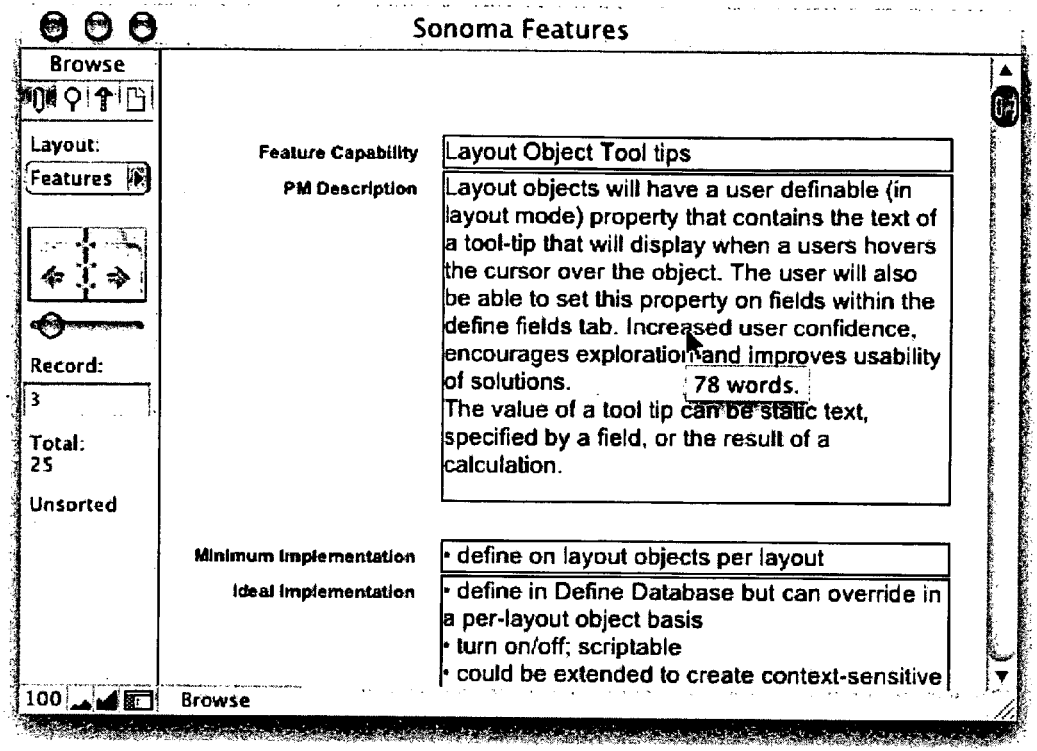

As depicted in FIG. 3F, a weather database may be stored in Celsius, but a calculation expression can be defined to convert data into Fahrenheit and display the result of the conversion when it is desired in accordance with one embodiment of the invention. As depicted in FIG. 3G, the total number of the words in a "PM description" field can be displayed in accordance with another embodiment of the invention.

Figure 3H:
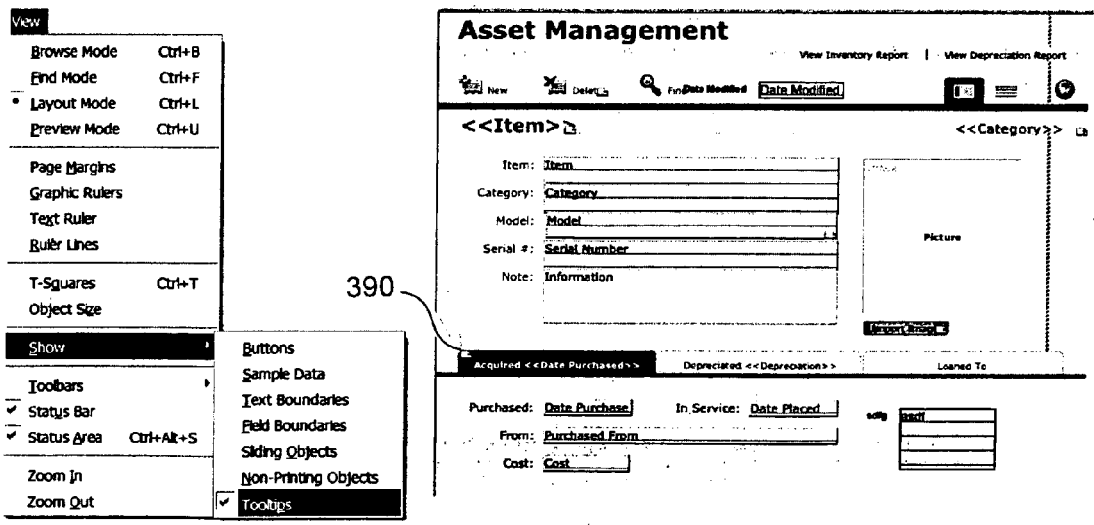

As noted above, an indicator may be provided and displayed, for example, in a layout mode to show that a calculation expression has been defined for a database object. It should also be noted that the process of defining a calculation expression for a database object may be introduced to users, as providing a "tooltip" which may be a readily understandable and more familiar concept to the users. As depicted in FIG. 3H, a modal dialog can be used for editing a "tooltip" in accordance with one embodiment of the invention. Referring to FIG. 3H, an indicator 390 can also be provided and displayed, for example, in a layout (or design mode) in accordance with one embodiment of the invention. The indicator 390 can be a relatively small icon that appears over a database object displayed in a layout mode. As depicted in FIG. 3H, the lower right corner of the indicator icon can, for example, be aligned with a upper left corner of a "Acquired<<Date Purchased" tab. In any case, the indicator can indicate to the user that a "tooltip" or (a calculation expression) has been defined.

Figure 4A:
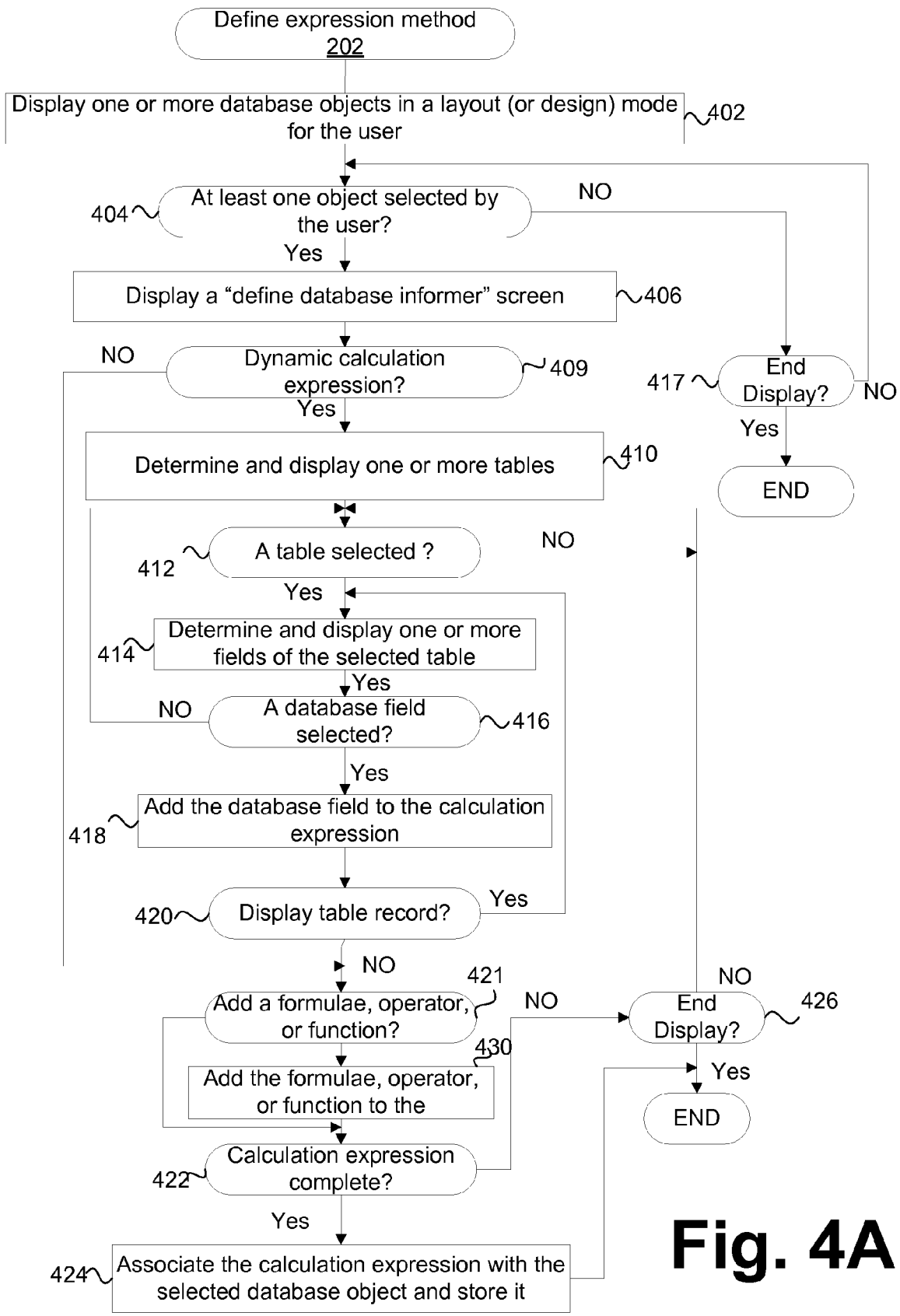
FIG. 4A depicts in greater detail a method for defining a calculation expression for a database object in accordance with one embodiment of the invention.

FIG. 4A depicts in greater detail a method 202 for defining a calculation expression for a database object. Initially, one or more database objects are displayed (402) in a layout (or design) mode for a user. Again, a database object can be any object that can be displayed, for example, in a page for a user (e.g., database field, header, of a report).

Figure 4B:
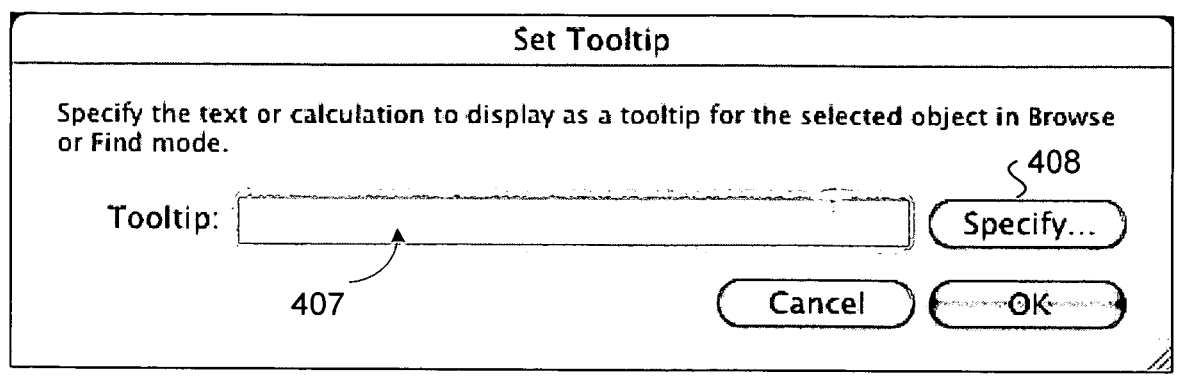
FIG. 4B is representative of a "define database-informer" screen in accordance with one embodiment of the invention.

Next, it is determined (404) whether the user has selected at least one of the objects which have been displayed (402). If it is determined (404) that no object has been selected, it is determined (417) whether to end the display (e.g., whether the user has requested to end the display in the layout mode) and the display method 202 ends. However, if it is determined (404) that an object has been selected, a "define database-informer" screen is displayed (406). FIG. 4B is a representative of a "define a database-informer" in accordance with one embodiment of the invention. It should be noted that the user may know this screen as a "set tooltip" screen and be provided with the option of entering text for a calculation expression in input portion 407 and select "ok" to define the calculation expression. The user, however, has the option to dynamically "specify" a calculation expression by selecting the specify option 408.

Referring back to FIG. 4A, it is determined (409) whether there is a request to specify a dynamic calculation expression (e.g., whether the user has selected the specify option 408). In other words, it can be determined whether a dynamic calculation expression is to be constructed using various options that are displayed rather than receiving a calculation expression as input text. If it is determined (409) that there is a request to specify a dynamic calculation expression, a "specify calculation," for example, "specify calculation" screen 310 (shown in FIG. 3B) can be displayed for the user. As such, referring back to FIG. 4A, one or more tables are determined and displayed (410). Next, it is determined (412)

whether a table has been selected, and one or more fields of the selected table can be determined and displayed (414) accordingly.

Next, if it is determined (416) that a database field has been selected, the database field is added (418) to the calculation expression. Thereafter, it is determined (420) whether the user has selected another table, and one or more fields can be displayed (414) for the selected table accordingly. In addition, it is determined (421) whether a formulae, operator, or function is to be added to the dynamic calculation expression. Accordingly, a formulae, operator, or function may be added (430) to the dynamic calculation expression. Thereafter, if it is determined (422) that the calculation expression is complete, it is determined (426) whether to end the display and the method 202 may end or proceed to determine (412) whether another table has been selected in a same manner as discussed above. However, if it is determined (422) that the calculation expression is complete, the calculation expression is associated with the selected object and stored (424) and the method 202 ends. The method 202 can also end if it is determined (406, 426) to end the display, for example, based on user request.

Figure 5:
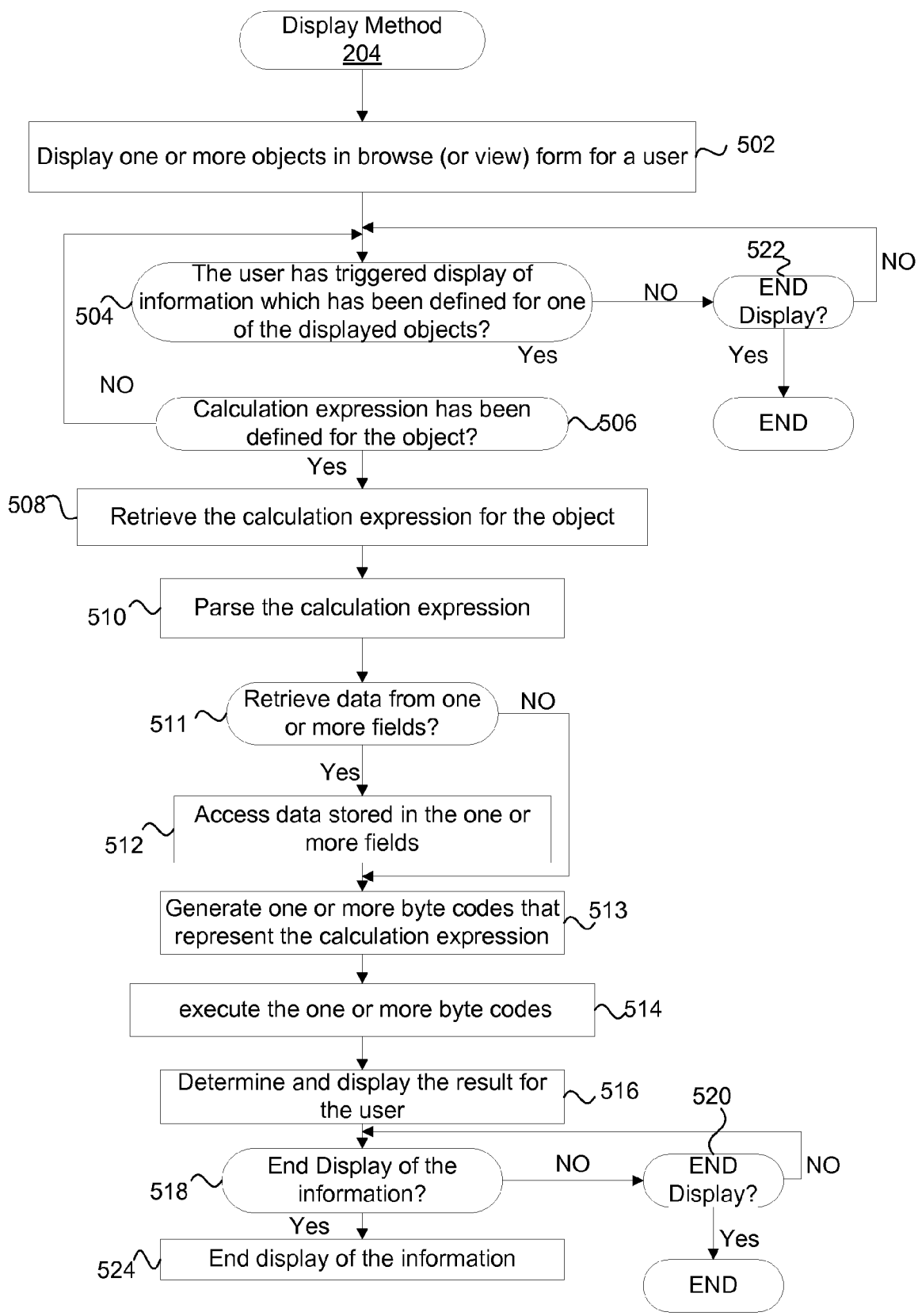
FIG. 5 depicts in greater detail a display method in accordance with one embodiment of the invention.

FIG. 5 depicts in greater detail a display method 204 in accordance with one embodiment of the invention. Initially, one or more objects are displayed in browse (or view) mode for a user. Next, it is determined (504) whether the user has triggered display of information which has been defined for one of the displayed objects. This determination (504) can, for example, be made by determining whether a cursor has been hovering in a determined proximity of the object, or by satisfying another predetermined event or condition. In any case, if it is determined (504) that the user has triggered display of the information, it is determined (506) whether a calculation expression has been defined for the object. According, a calculation expression can be retrieved (508) for the object. Next, the calculation expression is parsed (510). It should be noted that it is possible that one or more fields of the database are accessed (512) if it is determined (511) that one or more fields are to be accessed to generate (513) one or more byte-codes that represent the calculation expression.

In any case, the generated (513) byte-code(s) is(are) executed (514), and the result of the execution is determined and (or possibly converted) to displayable representation (e.g., text, graphics) which are displayed (516) for the user. Typically, the result of the execution (512) is displayed in a determined proximity of the displayed object. Next, it is determined (518) whether to end display of the information and the display of the information can end (524) accordingly. The display method 200 ends when it is determined (520, 522) to end the display, for example, based on user input that requests to end display.

The advantages of the invention are numerous. Different embodiments or implementations may yield one or more of the following advantages. One advantage is that the invention allows users of databases to view customized information based on various records in the database without having to view these records. Another advantage of the invention is that users of databases are able to conveniently define powerful expressions based on various variables which are dynamically determined at runtime. Yet another advantage of the invention is that the desired information need not be stored or needlessly clutter the display as it can be determined and displayed on-demand and erased form the displays when no longer desired. Still another advantage of the invention is that schema or design of the database need not be modified in order to provide the database users with customized dynamic information on-demand.

The many features and advantages of the present invention are apparent from the written description, and thus, it is intended by the appended claims to cover all such features and advantages of the invention. Further, since numerous modifications and changes will readily occur to those skilled in the art, the invention should not be limited to the exact construction and operation as illustrated and described.

What is claimed is:

1. A computer-implemented method for automatically displaying a tooltip associated with a displayed database object, the method comprising: providing a database containing a plurality of records, wherein each record in the plurality of records includes at least one field;

displaying, in a layout or design form, a visual representation of the database, the visual representation including one or more selectable database objects, wherein each database object corresponds to a field stored in the database, wherein each database object is associated with one or more state-variables defined in the database;

receiving an indication to select a first database object, wherein the indication is determined by satisfying a condition or triggering an event;

automatically calculating a tooltip corresponding to the first database object, wherein the tooltip has been previously defined for the first database object by a user of the database, wherein the tooltip provides information that is related to the first database object;

automatically parsing an expression that is defined for displaying the tooltip, wherein the expression comprises one or more state-variables that are related to the first database object, wherein the one or more state-variables are stored in one or more records of the database; automatically determining one or more values for the one or more state-variables of the expression;

dynamically evaluating the expression based on the one or more determined values of the one or more state-variables; and automatically displaying the tooltip with a result of the evaluated expression, wherein the tooltip is displayed proximate to and concurrently with the displayed first database object.

2. The method of claim 1, further comprising: defining one or more user-defined tooltip expressions by:

for each of the plurality of displayed database objects, providing a visual indication of whether or not the corresponding database object has an associated user-defined tooltip expression; and for each of the plurality of displayed database objects that does not have an associated user-defined tooltip expression, displaying at least one table or field of a record of a database to aid a user in defining a user-defined tooltip expression.

3. The method of claim 2, wherein the at least one displayed table or field of a record of a database to aid a user in defining a user-defined tooltip expression includes a table or field related to the field of the corresponding database object.

4. The method of claim 1, wherein the expression is a mathematical operation.

5. The method of claim 1, wherein the expression is a logical operation.

6. The method of claim 1, wherein the expression is a text processing operation.

7. The method of claim 1, wherein the expression is a database function.

8. The method of claim 1, wherein the indication includes a user positioning a cursor over the database object in a display, for a predetermined period of time.

9. The method of claim 1, wherein the automatically determining one or more values identifies one or more database records that contain values for the state-variables.

10. A database system comprising:
- a database containing a plurality of records, wherein each record in the plurality of records includes at least one field;
- a database engine communicatively coupled to the database; and
- a graphical user interface, wherein the graphical user interface is configured to: display, in a layout or design form, a visual representation of the database, the visual representation including one or more selectable database objects, wherein each database object corresponds to a field stored in the database, wherein each database object is associated with one or more state-variables defined in the database;
- receive an indication to select a first database object, wherein the indication is determined by satisfying a condition or triggering an event;
- automatically calculate a tooltip corresponding to the first database object, wherein the tooltip has been previously defined for the first database object by a user of the database, wherein the tooltip provides information that is related to the first database object;
- automatically parse an expression that is defined for displaying the tooltip, wherein the expression comprises one or more state-variables that are related to the first database object, wherein the one or more state-variables are stored in one or more records of the database;
- automatically determine one or more values for the one or more state-variables of the expression;
- dynamically evaluate the expression based on the one or more determined values of the one or more state-variables; and
- automatically display the tooltip with a result of the evaluated expression, wherein the tooltip is displayed proximate to and concurrently with the displayed first database object.

11. The database system of claim 10, wherein the expression is a mathematical operation.

12. The database system of claim 10, wherein the expression is a logical operation.

13. The database system of claim 10, wherein the expression is a text processing operation.

14. The database system of claim 10, wherein the expression is a database function.

15. The database system of claim 10, wherein the indication includes a user positioning a cursor over the database object in a display, for a predetermined period of time.

16. The database system of claim 10, wherein the automatically determining one or more values identifying one or more database records that contain values for the state-variables.

17. A computer-readable medium tangibly embodying a set of computer instructions executable by a machine to perform a method for automatically displaying a tooltip associated with a displayed database object, the method comprising:
- providing a database containing a plurality of records, wherein each record in the plurality of records includes at least one field;
- displaying, in a layout or design form, a visual representation of the database, the visual representation including one or more selectable database objects, wherein each database object corresponds to a field stored in the database, wherein each database object is associated with one or more state-variables defined in the database;
- receiving an indication to select a first database object, wherein the indication is determined by satisfying a condition or triggering an event;
- automatically calculating a tooltip corresponding to the first database object, wherein the tooltip has been previously defined for the first database object by a user of the database, wherein the tooltip provides information that is related to the first database object;
- automatically parsing an expression that is defined for displaying the tooltip, wherein the expression comprises one or more state-variables that are related to the first database object, wherein the one or more state-variables are stored in one or more records of the database;
- automatically determining one or more values for the one or more state-variables of the expression;
- dynamically evaluating the expression based on the one or more determined values of the one or more state-variables; and
- automatically displaying the tooltip with a result of the evaluated expression, wherein the tooltip is displayed proximate to and concurrently with the displayed first database object.

18. The computer readable medium of claim 17, wherein the expression includes a concatenation of multiple strings of characters.

19. The computer readable medium of claim 17, wherein the method further comprises:
- displaying an expression definition screen containing a plurality of database objects and an indication of whether or not the corresponding database object has an associated tooltip.

20. The computer readable medium of claim 17, wherein the indication of whether or not the corresponding database object has an associated tooltip is a small yellow box displayed when a database object has an associated tooltip.

* * * * *